(12) United States Patent
Ramasamy et al.

(10) Patent No.: US 10,223,222 B2
(45) Date of Patent: Mar. 5, 2019

(54) STORAGE SYSTEM-BASED REPLICATION FOR DISASTER RECOVERY IN VIRTUALIZED ENVIRONMENTS

(71) Applicant: International Business Machines Corporation, Armonk, NY (US)

(72) Inventors: Harigovind Ramasamy, Tarrytown, NY (US); Soumitra Sarkar, Cary, NC (US); Mahesh Viswanathan, Yorktown Heights, NY (US); Long Wang, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 14/976,358

(22) Filed: Dec. 21, 2015

(65) Prior Publication Data

US 2017/0177454 A1   Jun. 22, 2017

(51) Int. Cl.
*G06F 11/00* (2006.01)
*G06F 11/20* (2006.01)

(52) U.S. Cl.
CPC .... *G06F 11/2094* (2013.01); *G06F 2201/805* (2013.01); *G06F 2201/815* (2013.01)

(58) Field of Classification Search
CPC ............ G06F 11/1456; G06F 11/2056; G06F 2201/84; G06F 3/065; G06F 3/067; G06F 11/1092
See application file for complete search history.

(56) References Cited

U.S. PATENT DOCUMENTS

| 6,173,377 B1* | 1/2001 | Yanai | .................... G06F 3/0601 |
| | | | 711/154 |
| 6,654,862 B2* | 11/2003 | Morris | ................ G06F 11/2058 |
| | | | 711/111 |
| 8,645,750 B2* | 2/2014 | Kaneko | .................... G06F 11/07 |
| | | | 714/6.1 |
| 2003/0079156 A1* | 4/2003 | Sicola | ................. G06F 11/0727 |
| | | | 714/4.1 |
| 2003/0158869 A1* | 8/2003 | Micka | ................. G06F 11/2074 |

(Continued)

*Primary Examiner* — Bryce P Bonzo
*Assistant Examiner* — Jeison C Arcos
(74) *Attorney, Agent, or Firm* — Ryan, Mason & Lewis, LLP

(57) ABSTRACT

Methods, systems, and computer program products for storage system-based replication for disaster recovery in virtualized environments are provided herein. A computer-implemented method includes identifying, among multiple storage aggregation units within a virtualized environment, one or more of the storage aggregation units to undergo a change in disaster recovery replication status from (i) enabled to disabled or (ii) disabled to enabled; determining one of multiple mechanisms to execute the change in disaster recovery replication status for each of the identified storage aggregation units by (i) implementing an optimization algorithm to each of the multiple mechanisms and (ii) identifying the one of the multiple mechanisms that minimizes data copy overhead based on the optimization algorithm; and executing the change in disaster recovery replication status for each of the identified storage aggregation units within the virtualized environment in accordance with the one of the multiple mechanisms that minimizes data copy overhead.

20 Claims, 2 Drawing Sheets

IDENTIFY, AMONG MULTIPLE STORAGE AGGREGATION UNITS WITHIN A VIRTUALIZED ENVIRONMENT, ONE OR MORE OF THE STORAGE AGGREGATION UNITS TO UNDERGO A CHANGE IN DISASTER RECOVERY REPLICATION STATUS FROM (i) ENABLED TO DISABLED OR (ii) DISABLED TO ENABLED — 202

DETERMINE ONE OF MULTIPLE MECHANISMS TO EXECUTE THE CHANGE IN DISASTER RECOVERY REPLICATION STATUS FOR EACH OF THE ONE OR MORE IDENTIFIED STORAGE AGGREGATION UNITS BY (i) IMPLEMENTING AN OPTIMIZATION ALGORITHM TO EACH OF THE MULTIPLE MECHANISMS AND (ii) IDENTIFYING THE ONE OF THE MULTIPLE MECHANISMS THAT MINIMIZES DATA COPY OVERHEAD BASED ON THE OPTIMIZATION ALGORITHM — 204

EXECUTE THE CHANGE IN DISASTER RECOVERY REPLICATION STATUS FOR EACH OF THE ONE OR MORE IDENTIFIED STORAGE AGGREGATION UNITS WITHIN THE VIRTUALIZED ENVIRONMENT IN ACCORDANCE WITH THE ONE OF THE MULTIPLE MECHANISMS THAT MINIMIZES DATA COPY OVERHEAD — 206

(56) References Cited

U.S. PATENT DOCUMENTS

| | | | |
|---|---|---|---|
| 2003/0221074 A1* | 11/2003 | Satoyama | G06F 3/0605 711/162 |
| 2004/0049572 A1* | 3/2004 | Yamamoto | G06F 11/0727 709/224 |
| 2004/0103261 A1* | 5/2004 | Honda | G06F 3/0605 711/202 |
| 2004/0107315 A1* | 6/2004 | Watanabe | G06F 11/1451 711/114 |
| 2005/0066128 A1* | 3/2005 | Yagisawa | G06F 3/0607 711/114 |
| 2006/0031594 A1* | 2/2006 | Kodama | G06F 11/2058 710/5 |
| 2006/0095700 A1* | 5/2006 | Sato | G06F 3/0605 711/165 |
| 2006/0101214 A1* | 5/2006 | Mikami | G06F 11/2069 711/162 |
| 2006/0129608 A1* | 6/2006 | Sato | G06F 11/1456 |
| 2006/0136633 A1* | 6/2006 | Harima | G06F 3/0605 710/104 |
| 2006/0150001 A1* | 7/2006 | Eguchi | G06F 11/142 714/6.1 |
| 2006/0277445 A1* | 12/2006 | Kano | G06F 11/0727 714/42 |
| 2007/0162717 A1* | 7/2007 | Mikami | G06F 11/2069 711/162 |
| 2007/0255920 A1* | 11/2007 | Gold | G06F 3/0611 711/170 |
| 2008/0104346 A1* | 5/2008 | Watanabe | G06F 11/2069 711/162 |
| 2008/0104443 A1* | 5/2008 | Akutsu | G06F 11/2058 714/6.12 |
| 2008/0126842 A1* | 5/2008 | Jacobson | G06F 11/1662 714/6.12 |
| 2008/0178185 A1* | 7/2008 | Okada | G06F 11/1469 718/103 |
| 2008/0263393 A1* | 10/2008 | Shirogane | G06F 11/1088 714/6.32 |
| 2010/0106907 A1* | 4/2010 | Noguchi | G06F 11/2069 711/114 |
| 2013/0024433 A1* | 1/2013 | Amit | H03M 7/30 707/693 |

* cited by examiner

STORAGE SYSTEM-BASED REPLICATION FOR DISASTER RECOVERY IN VIRTUALIZED ENVIRONMENTS

FIELD

The present application generally relates to information technology, and, more particularly, to disaster recovery techniques.

BACKGROUND

Storage system-based replication is becoming increasingly prevalent for disaster recovery (DR) of complex applications deployed in the Cloud. Existing storage provisioning approaches are commonly used to assign storage to virtual servers, which is then replicated to enable resiliency against disasters. However, such existing approaches are typically platform-specific, and often include large overhead costs.

SUMMARY

In one embodiment of the present invention, techniques for storage system-based replication for disaster recovery in virtualized environments are provided. An exemplary computer-implemented method can include identifying, among multiple storage aggregation units within a virtualized environment, one or more of the storage aggregation units to undergo a change in disaster recovery replication status from (i) enabled to disabled or (ii) disabled to enabled. The exemplary method can also include determining one of multiple mechanisms to execute the change in disaster recovery replication status for each of the one or more identified storage aggregation units by (i) implementing an optimization algorithm to each of the multiple mechanisms and (ii) identifying the one of the multiple mechanisms that minimizes data copy overhead based on the optimization algorithm. Further, the exemplary method can include executing the change in disaster recovery replication status for each of the one or more identified storage aggregation units within the virtualized environment in accordance with the one of the multiple mechanisms that minimizes data copy overhead.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an embodiment of the present invention includes flexible and optimized storage system-based replication for DR in virtualized environments. At least one embodiment of the invention includes enabling selection of the level of granularity in which replication is to be carried out, as well as dynamically setting such replication on/off. For example, a user can dynamically turn "on" or "off" replication of a virtual machine (VM) disk or a data store by checking/unchecking a checkbox near the relevant disk or data store at the cloud portal. However, a VM disk or data store is not a replication granularity, and a replication granularity of Global Mirror (GM) or other storage-level replication is a storage area network (SAN) logical unit (LU). When GM is used to carry out the replication, a LU is turned "on" by applying the GM replication to this LU, and a LU is turned "off" by disabling the GM replication to this LU.

As further detailed herein, one or more embodiments of the invention include implementing a flexible storage allocation scheme that is platform- and replication technology-agnostic, and that can be coupled with the use of one or more optimization algorithms to maximize efficiency and minimize overhead of replication for DR. Additionally, at least one embodiment of the invention includes implementing such a storage allocation scheme in a Cloud computing environment.

With respect to being platform-agnostic, at least one embodiment of the invention can be applied to a variety of hypervisor and/or virtualization technologies such as VMWare®, kernel-based virtual machine (KVM), etc. With respect to being replication technology-agnostic, at least one embodiment of the invention can be applied to any storage system-based replication technology or replication technique.

At least one embodiment of the invention, as detailed herein, depends on a storage aggregation mechanism in the hypervisor as a unit of allocation, which can be mapped to a single SAN LU. In hypervisors wherein the basic unit of VM disk/storage management is a file system, the storage aggregation unit can be a mounted file system in the hypervisor. Additionally, in hypervisors wherein the basic unit of VM disk management is not a file system, the aggregation unit can be a volume group.

Figure 1:
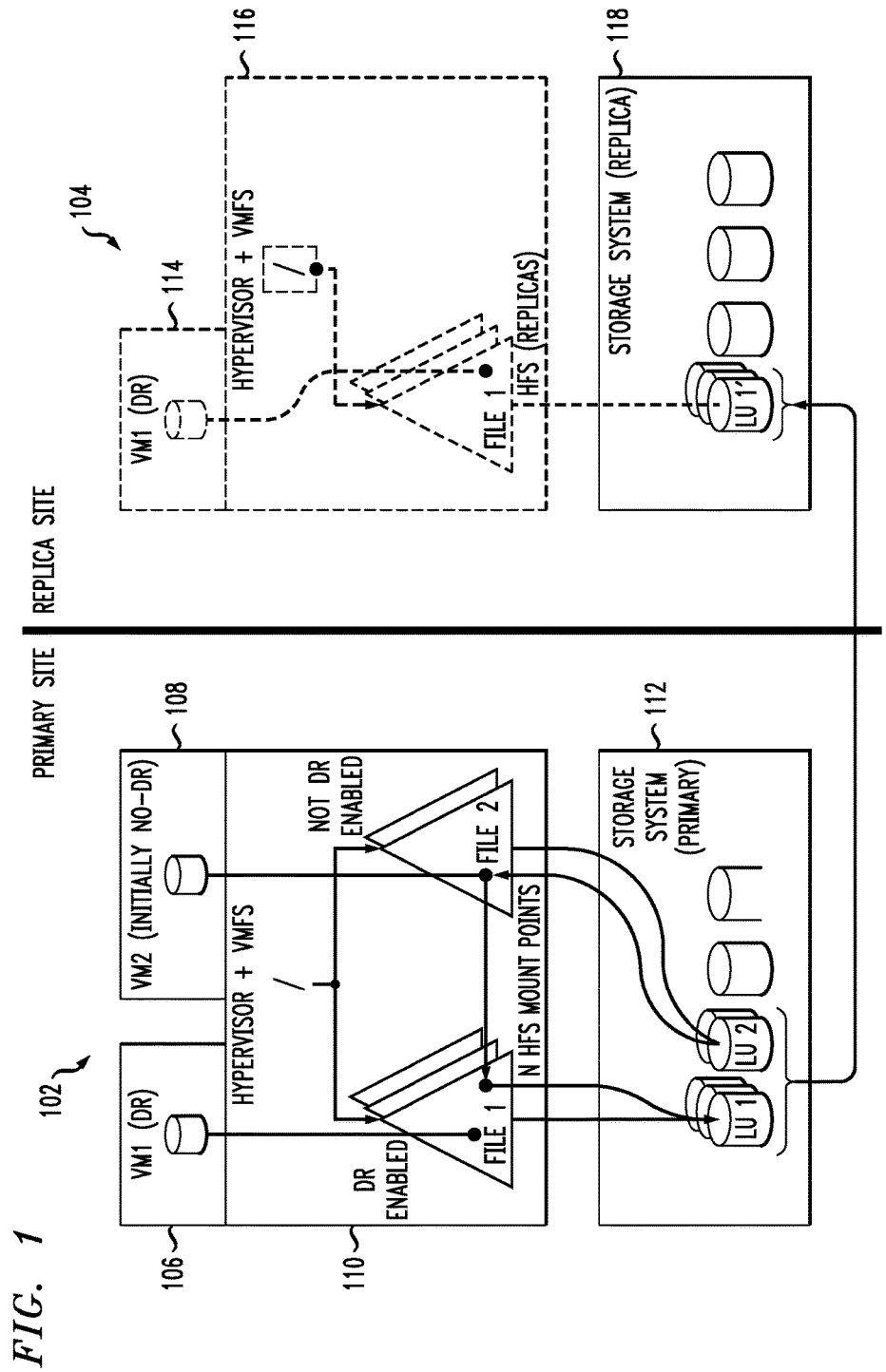
FIG. 1 is a diagram illustrating system architecture, according to an exemplary embodiment of the invention.

FIG. 1 is a diagram illustrating system architecture, according to an embodiment of the invention. By way of illustration, FIG. 1 depicts a flexible scheme, such as detailed herein, applicable to both hypervisor file system (HFS) and non-HFS contexts. As also further described herein, an example embodiment of the invention, such as depicted in FIG. 1, can implement replication at a partial HFS or volume group level. In the example of FIG. 1, each triangle represents a mounted partial HFS (a mount point in a HFS; for example, a directory in a file system), while in one or more additional embodiments of the invention (for non-HFS contexts, as detailed herein), each triangle could represent a volume group (in which case, file X can be mapped to level X).

FIG. 1 depicts a primary site 102 and a replica site 104. The primary site 102 includes a first VM (VM1) 106, which is DR-enabled. The primary site 102 also includes a second VM (VM2) 108, which is (initially) not DR-enabled. As also illustrated in FIG. 1, the primary site includes a hypervisor and VM file system (VMFS) 110, upon which VM 106 and VM 108 execute. As noted above, within the hypervisor and VMFS 110, each triangle represents a data store that is a mount point in the file system (110). In an alternative embodiment of the invention, each triangle can represent a volume group, which is also known as a data store in VMware®, for example. Additionally, in the FIG. 1 example embodiment, each VM disk file corresponds to one disk for a VM. A "file," as used in the previous sentence, is illustrated as a point/dot in a triangle in FIG. 1. As also illustrated in the example FIG. 1 depiction, each unit mounted at a mount point is a data store, which includes multiple LUs, and a VMFS (such as VMFS 110) includes multiple LUs.

An example unit of replication can be an LU, which stores a set of VM disk files. Additionally, a data store can include one or more replication units. Also, a VM disk belongs to a replication unit, and a VMFS can include multiple replication units. Further, in one or more embodiments of the invention, a replication unit belongs to only one VMFS. As also illustrated in FIG. 1, a VM can have certain disks that are DR-enabled/DR-replicated and other disks that are not DR-enabled. Further, one or more disks from different VMs can be included in the same data store.

As used herein (and particularly as used in connection with the example embodiment depicted in FIG. 1): (i) a "file" refers to a "VM disk file;" (ii) a "disk" refers to a VM disk, which is saved as a VM disk file in the VMFS (wherein VMFS is a VMware® concept/clustered file system); (iii) a "LU" refers to a SAN logical unit, which is a concept of a SAN, and wherein an LU is the smallest granularity of a replication; (iv) a "data store" refers to a VMware® concept which refers to storage space that is mounted at a mount point in a file system; and (v) a replication unit can include an LU, and the storage space mounted to a mount point may include a set of LUs. Also, as detailed herein, in a file system, a storage device or storage space can be mounted or unmounted at a directory of the file system by using the "mount" command, and such a mounted directory is referred to herein as a "mount point."

In the example embodiment depicted in FIG. 1, separate data stores exist within system 110 for DR-enabled VMs and non-DR-enabled VMs. Accordingly, in such an example embodiment, all of the DR-enabled VMs are associated with DR-enabled data stores, while all of the non-DR-enabled VMs are associated with non-DR-enabled data stores. Additionally, as described herein, it is noted that a data store is a storage space mounted at a directory (also known as mount point). This storage space can contain multiple files, with each file corresponding to a VM disk. Each VM disk may be DR-enabled or DR-disabled, according to user-specification for this disk, for example, in the Cloud portal. This storage space can include multiple LUs, and the VM disk files in this storage space may be placed in different LUs. Data stores are organized in such a way that a data store is DR-enabled or DR-disabled. This means that a DR-enabled data store contains DR-enabled VM disk files only, and a DR-disabled data store contains DR-disabled VM disk files only. Also, DR-enabled VM disk files are placed on DR-enabled LUs only, and DR-disabled VM disk files are placed on DR-disabled LUs only. Each LU can have unused space that can contain more VM disk files. DR-enabled LUs can only contain DR-enabled VM disk files and DR-disabled LUs can only contain DR-disabled VM disk files.

The primary site 102 further includes a (primary) storage system 112, which includes a collection of multiple LUs. At least one embodiment of the invention, such as depicted in FIG. 1, includes LU level storage mirroring. As such, in FIG. 1, the DR-enabled data stores are stored in a given set of LUs (identified as LU 1 in FIG. 1), while the non-DR-enabled data stores are stored in a separate set of LUs (identified as LU 2 in FIG. 1).

Accordingly, in connection with the FIG. 1 depiction, at least one embodiment of the invention includes determining an optimal manner of modifying the DR status of one or more VMs. For example, in FIG. 1, consider a situation wherein a user wishes VM 108, which is (initially) not DR-enabled, to be converted to DR-enabled. As detailed herein, one or more embodiments of the invention includes implementing an optimization algorithm to minimize the overhead (copy-related and/or management-related) of a dynamic DR status change of data stores (also referred to as mount points in the file system 110, represented by the triangles in FIG. 1).

As noted above, FIG. 1 also depicts a replica site 104. The replica site, as illustrated in FIG. 1, includes a replica of DR-enabled VM1 (enumerated as VM 114 in FIG. 1), hypervisor and VMFS 116 and a (replica) storage system 118 (which includes a copy of LU 1 (identified as LU 1' in FIG. 1)).

Accordingly, as depicted in the example embodiment of FIG. 1, VM 102 includes one disk; the disk is saved as the VM disk file File1, which is mounted into the hypervisor's file system 110 at a directory (also referred to as a mount point or a data store). VM 108 includes one disk; the disk is saved as File2, which is mounted at a mount point. File1 is DR-enabled and resides in LU1, a DR-enabled LU of a DR-enabled data store (in storage system 112). LU1 replicates to LU1' (in storage system 118), and File's replica in the replica site resides in LU1'. File2 is DR-disabled and resides in LU2, a DR-disabled LU of a DR-disabled data store (in storage system 112). When the user, customer or administrator specifies to enable DR for VM 108's disk at the portal, the File2 is copied from LU2 to LU1, and then is removed from LU2. At the same time, the directory path of File2 within the DR-disabled data store is removed and a new directory path within the DR-enabled data store is created, with the new path pointing to the File2 copy in LU1. As the Global Mirroring replicates the entire LU1, the File2 copy in LU1 now is replicated to replica site within LU1' (in storage system 118).

While the example embodiment of the invention depicted in FIG. 1 includes two VMs (for clarity of illustration), it should be appreciated and acknowledged that one or more embodiments of the invention can be implemented in connection with larger numbers of VMs, such as for example, systems encompassing thousands of VMs.

By way of further illustration, consider an example use case involving a desired DR-enablement of a VM disk or logical partition (LPAR). For each VM disk or LPAR d, at least one embodiment of the invention can include analyzing the following example options:

Option 1: Copy the disk d (that is, a file in FIFS) or the LPAR d from a non-replicated LU to a replicated LU; or Option 2: Copy other disks (that is, files in BFS) or LPARs in the d-hosting non-replicated LU to other non-replicated LU, and enable replication for the d-hosting LU.

Further, additionally consider a desired DR-disablement of a VM disk or LPAR. For each VM disk or LPAR d, at least one embodiment of the invention can include analyzing the following example options:

Option 3: Copy the disk d or the LPAR d from the replicated LU to a non-replicated LU; or Option 4: Copy other disks or LPARs in the d-hosting replicated LU to other replicated LU, and disable replication for the d-hosting LU.

Accordingly, one or more embodiments of the invention can include combining consideration/analysis of example Options 1 through 4 for a set of disks via an optimization algorithm to minimize copy overhead. Moreover, such an optimization algorithm can be implemented in connection with one or more embodiments of the invention in situations wherein there is a set of VM disks/LPARs to be DR enabled or disabled, and/or in situations wherein there are two (or more) sets of VM disks/LPARs, one (or more) to be DR-enabled and the other (one or more) to be DR-disabled.

Such an embodiment of the invention can include a problem formulation such as follows. A set of VM disks or LPARs (note that in the following example, a VM disk is used to refer to both a VM disk and a LPAR), V, are to be DR-enabled or DR-disabled. $V=\{, vd_1 vd_2, \ldots, vd_m\}$, wherein m is the number of VM disks (vd) to be DR-enabled or DR-disabled. Additionally, the VM disks V are on n LUs (comprising a set L), wherein $L=\{LU_1, LU_2, \ldots, LU_n\}$. Each $LU_j$ can include multiple properties, such as, for example: (i) $rep_j$(1: replicated, 0: not replicated), and (ii) $used_j$(bytes used). The property of "bytes used" is used in the optimization algorithm to determine which action should be applied for a LU. By way of example, suppose $LU_1$ is DR-disabled, $LU_1$ has 100 GB, and 70 GB of them are used (leaving 30 GB as free). As such, the $used_j$ for LU1 is 70 GB. The 70 GB can include, for example, seven VM disk files with 10 GB for each file. In such an example, assume that the customer now enables DR for two of the seven VM disk files. Then, the $sum_j$ for $LU_1$ is 20 GB, as 20 GB is the total size of the files with DR status to be changed (j=1 as the LU is LU1). If option 1 is used, the copy overhead is 20 GB ($sum_j$); if option 2 is used, the copy overhead is 70–20=50 GB ($used_j$–$sum_j$). Subsequently (as 20 GB is less than 50 GB), at least one embodiment of the invention can include selecting option 1 for $LU_1$ for implementing the customer's DR-enablement operation. It should be noted that this example pertains to a single-LU case, and it is to be appreciated that one or more embodiments of the invention can include incorporating the "bytes used" feature for multi-LU cases.

Additionally, let D denote the property set of all of the VM disks V. Each virtual disk k ($vd_k$) in V can include multiple properties, such as, for example: (i) size $s_k$, and (ii) the identifier (ID) of the LU on which the disk resides, $i_k$. Accordingly, $D=\{(s_k, i_k)|k=1, 2, \ldots, m\}$.

Further, let E denote the bytes used for all LUs by the VM disks in V. As such, $E=\{sum_j|sum_j=sum(s_k)$ for all $(s_k, i_k)$ in D with the same $i_k\}$.

Consider, also, that there can be two actions when DR is enabled/disabled for VM disks on $LU_j$:

Action 1 (example Option 1 and example Option 3 noted above): Copy the data of VM disks that are in both V and $LU_j$, out of $LU_j$. The overhead for such an action=$sum_j$.

Action 2 (example Option 2 and example Option 4 noted above): Copy the data of VM disks that are not in V but are in $LU_j$, out of $LU_j$, and toggle $LU_j$ as replicated to become not replicated. The overhead for such an action=$used_j$–$sum_j$.

An optimization goal of one or more embodiments of the invention can include minimizing the data copy overhead when DR is enabled/disabled for one or more VM disks. In connection with the above-noted Action 1 and Action 2, let $A_j$=1 if Action 1 is taken for $LU_j$, and let $A_j$=0 if Action 2 is taken. An objective of one or more embodiments of the invention can therefore include resolving the $A_j$ values to achieve $min(A_j*sum_j+(1-A_j)*(used_j-sum_j))$ for all LUs in L. An objective of this equation can include (using an above-noted example) the following: if option 1 is used, the copy overhead is 20 GB; if option 2 is used, the copy overhead is 70–20=50 GB. As 20 GB<50 GB, then option 1 would be selected for $LU_1$ for implementing the customer's DR-enablement operation.

As such, at least one embodiment of the invention can include implementing an optimization algorithm such as the following. Input for such an optimization algorithm can include $E=\{sum_j|sum_j=sum(s_k)$ for all $(s_k, i_k)$ with the same $i_k$ in D}, wherein E is computed from D, and D is derived from V. Input can further include the properties $rep_j$ and $used_j$ for all $LU_j$ in L, wherein $L=\{LU_1, LU_2, \ldots, LU_n\}$, and wherein L is derived from V.

Based on such inputs, one or more embodiments of the invention include computing and/or obtaining the $A_j$ values to minimize X for L, wherein $X=\Sigma x(A_j)$ for all j (j=1 . . . n), and $x(A_j)=A_j*sum_j+(1-A_j)*(used_j-sum_j)$. $x(A_j)$ is the copy overhead for $LU_j$. Again using the above-noted example, $x(A_j)$ can be either 20 GB (if $A_j$=1) or 50 GB (if $A_j$=0). X is the sum of the copy overheads for all involved LUs. Additionally, as detailed herein, an optimization algorithm can be implemented in one or more embodiments of the invention to resolve such a problem. Further, for each $LU_j$ in L, at least one embodiment of the invention includes computing x(0) and x(1). x(0) for $LU_j$ represents the copy overhead if action 1 is used for the $LU_j$(for example, the 20 GB in the above-noted example). x(1) for $LU_j$ represents the copy overhead if action 2 is used for the $LU_j$(for example, the 50 GB in the above-noted example). In such an embodiment, if (x(0)>x(1)), $A_j$=1; else $A_j$=0.

Figure 2:
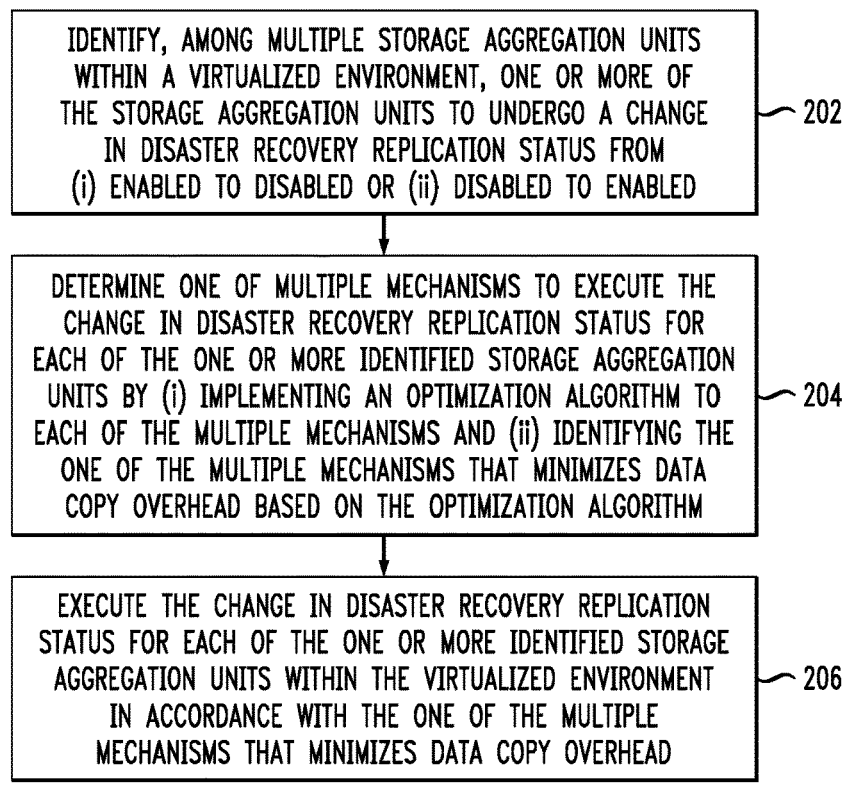
FIG. 2 is a flow diagram illustrating techniques according to an embodiment of the invention.

FIG. 2 is a flow diagram illustrating techniques according to an embodiment of the present invention. Step 202 includes identifying, among multiple storage aggregation units within a virtualized environment, one or more of the storage aggregation units to undergo a change in disaster recovery replication status from (i) enabled to disabled or (ii) disabled to enabled. In one or more embodiments of the invention, each of the multiple storage aggregation units can include multiple virtual machine disks. Alternatively, in one or more embodiments of the invention, each of the multiple storage aggregation units can include multiple logical partitions.

Also, in one or more embodiments of the invention, the one or more identified storage aggregation units are executing on a set of multiple logical units. Each of the multiple logical units can include one or more properties such as, for example, an identification of total bytes used, and an identification of disaster recovery replication status.

Step 204 includes determining one of multiple mechanisms to execute the change in disaster recovery replication status for each of the one or more identified storage aggregation units by (i) implementing an optimization algorithm to each of the multiple mechanisms and (ii) identifying the one of the multiple mechanisms that minimizes data copy overhead based on the optimization algorithm. In one or more embodiments of the invention, the data copy overhead can include a measure of bytes used. Also, identifying the one of the multiple mechanisms that minimizes data copy overhead based on the optimization algorithm can include identifying the one of the multiple mechanisms that achieves a minimum overhead value for all logical units across the set of multiple logical units.

One of the multiple mechanisms to execute the change in disaster recovery replication status (for example, from enabled to disabled) for each of the one or more identified storage aggregation units can include (a) copying the data of all of the storage aggregation units that are (i) among the one or more identified storage aggregation units and (ii) executing on a logical unit that is disaster recovery replication-enabled, and (b) transferring the copied data to a logical unit that is disaster recovery replication-disabled. Additionally, one of the multiple mechanisms to execute the change in disaster recovery replication status (for example, from disabled to enabled) for each of the one or more identified storage aggregation units can include (a) copying the data of all of the storage aggregation units that are (i) among the one or more identified storage aggregation units and (ii) executing on a logical unit that is disaster recovery replication-disabled, and (b) transferring the copied data to a logical unit that is disaster recovery replication-enabled.

One of the multiple mechanisms to execute the change in disaster recovery replication status (for example, from enabled to disabled) for each of the one or more identified storage aggregation units can also include (a) copying the data of all of the storage aggregation units that (i) are not among the one or more identified storage aggregation units and (ii) are executing on a first logical unit that is disaster recovery replication-enabled, (b) transferring the copied data to a second logical unit that is disaster recovery replication-enabled, and (c) changing the disaster recovery replication status of the first logical unit from disaster recovery replication-enabled to disaster recovery replication-disabled. Additionally, one of the multiple mechanisms to execute the change in disaster recovery replication status (for example, from disabled to enabled) for each of the one or more identified storage aggregation units can also include (a) copying the data of all of the storage aggregation units that (i) are not among the one or more identified storage aggregation units and (ii) are executing on a first logical unit that is disaster recovery replication-disabled, (b) transferring the copied data to a second logical unit that is disaster recovery replication-disabled, and (c) changing the disaster recovery replication status of the first logical unit from disaster recovery replication-disabled to disaster recovery replication-enabled.

Step 206 includes executing the change in disaster recovery replication status for each of the one or more identified storage aggregation units within the virtualized environment in accordance with the one of the multiple mechanisms that minimizes data copy overhead.

The techniques depicted in FIG. 2 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 3:
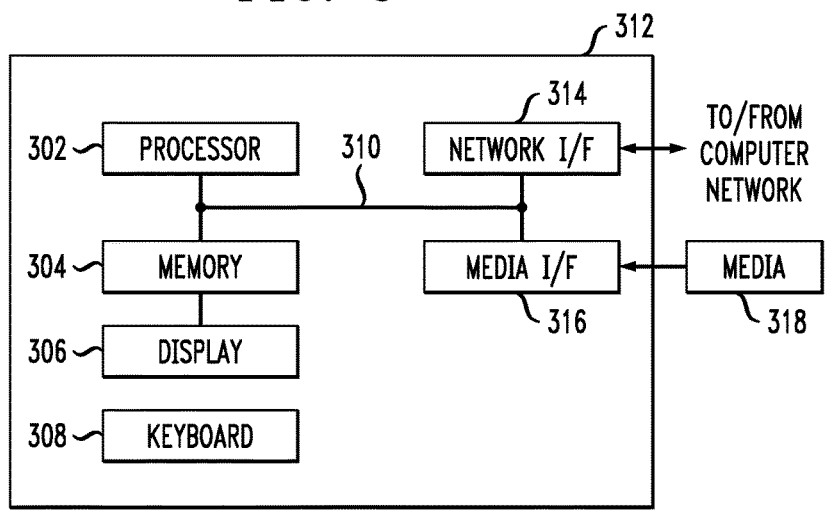
FIG. 3 is a system diagram of an exemplary computer system on which at least one embodiment of the invention can be implemented.

Additionally, an embodiment of the present invention can make use of software running on a computer or workstation. With reference to FIG. 3, such an implementation might employ, for example, a processor 302, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 302. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing a flexible storage allocation scheme that is platform- and replication technology-agnostic.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, among multiple storage aggregation units within a virtualized environment, one or more of the storage aggregation units to undergo a change in disaster recovery replication status from (i) enabled to disabled or (ii) disabled to enabled; and
   executing the change in disaster recovery replication status for each of the one or more identified storage aggregation units by implementing an optimization algorithm that minimizes data copy overhead;
   wherein the steps are carried out by at least one computing device.

2. The computer-implemented method of claim 1, wherein each of the multiple storage aggregation units comprises multiple virtual machine disks.

3. The computer-implemented method of claim 1, wherein each of the multiple storage aggregation units comprises multiple logical partitions.

4. The computer-implemented method of claim 1, wherein the one or more identified storage aggregation units are executing on a set of multiple logical units.

5. The computer-implemented method of claim 4, wherein each of the multiple logical units comprises one or more properties.

6. The computer-implemented method of claim 5, wherein the one or more properties comprise at least an identification of total bytes used.

7. The computer-implemented method of claim 5, wherein the one or more properties comprise at least an identification of disaster recovery replication status.

8. The computer-implemented method of claim 7, wherein executing the change in disaster recovery replication status for each of the one or more identified storage aggregation units comprises at least:
   copying the data of all of the storage aggregation units that are (i) among the one or more identified storage aggregation units and (ii) executing on a logical unit that is disaster recovery replication-enabled; and
   transferring the copied data to a logical unit that is disaster recovery replication-disabled.

9. The computer-implemented method of claim 7, wherein executing the change in disaster recovery replication status for each of the one or more identified storage aggregation units comprises at least:
   copying the data of all of the storage aggregation units that are (i) among the one or more identified storage aggregation units and (ii) executing on a logical unit that is disaster recovery replication-disabled; and
   transferring the copied data to a logical unit that is disaster recovery replication-enabled.

10. The computer-implemented method of claim 7, wherein executing the change in disaster recovery replication status for each of the one or more identified storage aggregation units comprises at least:
    copying the data of all of the storage aggregation units that (i) are not among the one or more identified storage aggregation units and (ii) are executing on a first logical unit that is disaster recovery replication-enabled;
    transferring the copied data to a second logical unit that is disaster recovery replication-enabled;
    changing the disaster recovery replication status of the first logical unit from disaster recovery replication-enabled to disaster recovery replication-disabled.

11. The computer-implemented method of claim 7, wherein executing the change in disaster recovery replication status for each of the one or more identified storage aggregation units comprises at least:
    copying the data of all of the storage aggregation units that (i) are not among the one or more identified storage aggregation units and (ii) are executing on a first logical unit that is disaster recovery replication-disabled;
    transferring the copied data to a second logical unit that is disaster recovery replication-disabled;
    changing the disaster recovery replication status of the first logical unit from disaster recovery replication-disabled to disaster recovery replication-enabled.

12. The computer-implemented method of claim 4, wherein the optimization algorithm achieves a minimum overhead value for all logical units across the set of multiple logical units.

13. The computer-implemented method of claim 1, wherein the data copy overhead comprises a measure of bytes used.

14. A computer program product comprising a computer readable storage medium having program instructions embodied therewith, the program instructions executable by a device to cause the device to:
    identify, among multiple storage aggregation units within a virtualized environment, one or more of the storage aggregation units to undergo a change in disaster recovery replication status from (i) enabled to disabled or (ii) disabled to enabled; and
    to execute the change in disaster recovery replication status for each of the one or more identified storage aggregation units by implementing an optimization algorithm that minimizes data copy overhead.

15. The computer program product of claim 14, wherein the one or more identified storage aggregation units are executing on a set of multiple logical units, wherein each of the multiple logical units comprises one or more properties comprising at least an identification of disaster recovery replication status.

16. The computer program product of claim 15, wherein executing the change in disaster recovery replication status for each of the one or more identified storage aggregation units comprises at least:
    copying the data of all of the storage aggregation units that are (i) among the one or more identified storage aggregation units and (ii) executing on a logical unit that is disaster recovery replication-enabled; and transferring the copied data to a logical unit that is disaster recovery replication-disabled.

17. The computer program product of claim 15, wherein executing the change in disaster recovery replication status for each of the one or more identified storage aggregation units comprises at least:

copying the data of all of the storage aggregation units that are (i) among the one or more identified storage aggregation units and (ii) executing on a logical unit that is disaster recovery replication-disabled; and transferring the copied data to a logical unit that is disaster recovery replication-enabled.

18. The computer program product of claim 15, wherein executing the change in disaster recovery replication status for each of the one or more identified storage aggregation units comprises at least:

copying the data of all of the storage aggregation units that (i) are not among the one or more identified storage aggregation units and (ii) are executing on a first logical unit that is disaster recovery replication-enabled;

transferring the copied data to a second logical unit that is disaster recovery replication-enabled;

changing the disaster recovery replication status of the first logical unit from disaster recovery replication-enabled to disaster recovery replication-disabled.

19. The computer program product of claim 15, wherein executing the change in disaster recovery replication status for each of the one or more identified storage aggregation units comprises at least:

copying the data of all of the storage aggregation units that (i) are not among the one or more identified storage aggregation units and (ii) are executing on a first logical unit that is disaster recovery replication-disabled;

transferring the copied data to a second logical unit that is disaster recovery replication-disabled;

changing the disaster recovery replication status of the first logical unit from disaster recovery replication-disabled to disaster recovery replication-enabled.

20. A system comprising:

a memory; and at least one processor coupled to the memory and configured for:

identifying, among multiple storage aggregation units within a virtualized environment, one or more of the storage aggregation units to undergo a change in disaster recovery replication status from (i) enabled to disabled or (ii) disabled to enabled; and executing the change in disaster recovery replication status for each of the one or more identified storage aggregation units by implementing an optimization algorithm that minimizes data copy overhead.

* * * * *